United States Patent [19]

Inoue et al.

[11] Patent Number: 5,710,684
[45] Date of Patent: Jan. 20, 1998

[54] CLEANING MECHANISM FOR A MAGNETIC HEAD AND A METHOD OF PRODUCING A CLEANING BRUSH HAVING BRUSH PIECES INTEGRALLY MOLDED WITH A RESIN BLOCK

[75] Inventors: Naoto Inoue; Kiyotaka Yamaguchi, both of Yamagata, Japan

[73] Assignee: Mitsumi Electric Co., Ltd., Tokyo, Japan

[21] Appl. No.: 588,353

[22] Filed: Jan. 18, 1996

[30] Foreign Application Priority Data

Jan. 20, 1995 [JP] Japan .................. 7-025916

[51] Int. Cl.⁶ .................................. G11B 5/41
[52] U.S. Cl. .................................. 360/128
[58] Field of Search .................... 360/128, 137

[56] References Cited

U.S. PATENT DOCUMENTS

| | | | |
|---|---|---|---|
| 4,329,755 | 5/1982 | Alissandratos | 15/144.4 |
| 4,964,429 | 10/1990 | Cole | 132/218 |
| 5,003,658 | 4/1991 | Rolleri | 15/185 |
| 5,351,356 | 10/1994 | Townsend, Jr. | 15/114 |
| 5,355,269 | 10/1994 | Clausen | 360/128 |
| 5,383,076 | 1/1995 | Saito et al. | 360/128 |
| 5,396,392 | 3/1995 | Watanabe et al. | 360/132 |
| 5,469,318 | 11/1995 | Inoue et al. | 360/128 |
| 5,473,493 | 12/1995 | Kusui | 360/128 |
| 5,523,913 | 6/1996 | Kim | 360/128 |
| 5,588,343 | 12/1996 | Rust et al. | 81/489 |

FOREIGN PATENT DOCUMENTS 6-139530  5/1994  Japan ................... 360/128

*Primary Examiner*—Jefferson Evans
*Attorney, Agent, or Firm*—Whitham, Curtis, Whitham & McGinn

[57] ABSTRACT

In a cleaning mechanism for a magnetic head which mechanically cleans a recording/reproducing face of a magnetic head by using a cleaning brush, a basal portion of which is supported by a device fixing portion, a resin block is fixed to an end portion of an L-shaped brush stem of the cleaning brush, the brush stem being made of a metal plate, and a number of brush pieces which are to come into contact with the recording/reproducing face are formed integrally with the resin block.

11 Claims, 2 Drawing Sheets

5,710,684

CLEANING MECHANISM FOR A MAGNETIC HEAD AND A METHOD OF PRODUCING A CLEANING BRUSH HAVING BRUSH PIECES INTEGRALLY MOLDED WITH A RESIN BLOCK

BACKGROUND OF THE INVENTION

1. Field of the Invention

The invention relates to a magnetic head used for an audio tape or the like, and particularly to a cleaning mechanism for such a magnetic head and a method of producing a cleaning brush.

1. Related Art

In a magnetic head used for an audio tape or the like, if foreign materials such as magnetic powders and the like adhere to a recording/reproducing face of the magnetic head, generally, the recording/reproducing characteristics are extremely degraded. For this reason, cleaning tools for a recording/reproducing face are conventionally proposed in, for example, Unexamined Japanese Utility Model Publications SHO. 55-7123, SHO. 58-173025, SHO. 59-99217, and SHO. 60-9011.

Each of the preceding cleaning tools, however, is used for wiping the recording/reproducing face of a magnetic head while being held by hand from the outside of an apparatus. In many cases, such cleaning tools cannot be used because of restriction due to the structure of the apparatus. To comply with this, a cleaning mechanism is proposed which can clean such a recording/reproducing face at regular or irregular time intervals. For example, Unexamined Japanese Patent Publication No. HEI. 5-67318, is illustrated in FIGS. 4 and 5 which show the cleaning mechanism disclosed in the specification of the application. A magnetic head 1A which performs recording and reproducing on an audio tape (not shown) is attached to an azimuth supporting base 2A. The azimuth supporting base 2A is made of a resin and is provided with a tape guide 2a.

A cleaning brush 3A which is formed by bending a metal plate into an L-shape is supported by an attachment portion 2b of the azimuth supporting base 2A in such a manner that the brush can swing about a fulcrum screw 4A functioning as a fulcrum. A recording/reproducing face 1a of the magnetic head 1A is cleaned at regular or irregular time intervals by a number of nylon strings 6A which are supported by an end portion 5a of a brush stem 5A of the cleaning brush 3A. Although not shown in the figures, an actuator which could be operated by a reversing member for performing the reverse running of the audio tape or by a cleaning button which could be located at a basal portion of the brush stem 5A.

The cleaning mechanism having the above-described structure involves, however, a drawback in that a high production cost of the cleaning brush 3A prevents the cleaning mechanism from being practically used. Specifically, FIG. 5 shows a production process of the cleaning brush 3A which is formed by bending a metal plate. The end portion 5a of the cleaning brush 3A is first bent into a U-shape as shown in the figure. Thereafter, a number of nylon strings 6A are hung in an adjacent manner in the longitudinal direction of a core rod 7A. The core rod 7A is then inserted into the end portion 5a of the cleaning brush 3A. The end portion 5a is subjected to a secondary bending process as indicated by the phantom lines. Thereafter, tip ends of the nylon strings 6A are cut in an aligned manner. As described above, the steps of processing the cleaning brush 3A are very complicated, and the process cost is high. As a result, the production cost becomes relatively high.

SUMMARY OF THE INVENTION

It is a first object of the invention to provide a cleaning mechanism for a magnetic head comprising a cleaning brush having a structure which can be easily produced, in view of the above-described problems of a prior art cleaning mechanism for a magnetic head.

It is a second object of the invention to provide a method of efficiently producing a cleaning brush which can attain the first object.

According to the invention, the first object can be attained by a cleaning mechanism for a magnetic head which brings a recording/reproducing face of the magnetic head into a mechanically clean condition by using a cleaning brush, a basal portion of the cleaning brush being supported by a device fixing portion, wherein a resin block is fixed to an end portion of an L-shaped brush stem of the cleaning brush, the brush stem being made of a metal plate, and a number of brush pieces which are to come into contact with the recording/reproducing face are molded integrally with the resin block.

According to the invention, the second object can be attained by a method of producing a cleaning brush in a cleaning mechanism for a magnetic head which brings a recording/reproducing face of the magnetic head into a mechanically clean condition by using a cleaning brush, a basal portion of the cleaning brush being supported by a device fixing portion, wherein an end portion of a brush stem which is bent into an L-shape is placed in a mold in which a block cavity and brush voids are formed, and a resin block and brush pieces are molded integrally with the end portion.

As apparent from the above description, according to the invention, it is possible to obtain a cleaning mechanism which has a very simple structure and can be produced at a lower cost as compared with a prior art cleaning brush.

DETAILED DESCRIPTION OF THE PREFERRED EMBODIMENT

Hereinafter, an embodiment of the invention will be described in detail with reference to FIGS. 1 to 3.

Figure 1:
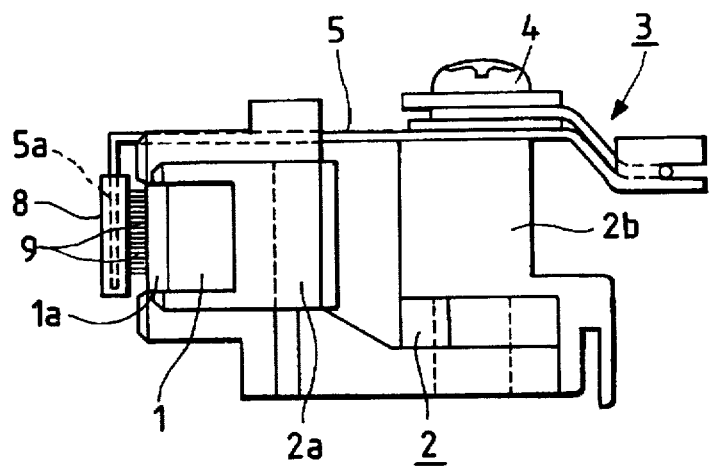
FIG. 1 is a side view of a cleaning mechanism for a magnetic head according to the invention.

Referring to FIG. 1, a cleaning mechanism for a magnetic head according to the invention is the same as the prior art mechanism in the following points. A magnetic head 1 which performs recording and reproducing on an audio tape (not shown) is attached to an azimuth supporting base 2. The azimuth supporting base 2 is made of a resin and provided with a tape guide 2a. A cleaning brush 3 which is formed by bending a metal plate into an L-shape is supported by an attachment portion 2b of the azimuth supporting base 2 in such a manner that the brush can swing about a fulcrum screw 4 functioning as a fulcrum.

Figure 2:
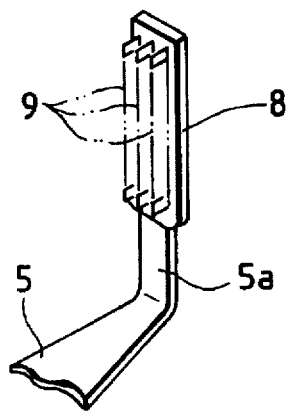
FIG. 2 is an enlarged perspective view of essential portions of a cleaning brush used in the cleaning mechanism for a magnetic head.

In the illustrated embodiment, as shown in FIG. 2, an end portion 5a of a brush stem 5 which constitutes the base of the cleaning brush 3 is processed into a narrow and long strip-like shape. A resin block 8 made of a resin such as nylon, or polyacetal is fixed to a portion closer to the end of the end portion 5a. A number of flexible brush pieces 9 which can come into contact with the recording/reproducing face 1a are integrally molded in the surface of the resin block 8 which faces the magnetic head 1.

Accordingly, the cleaning brush 3 having the above-described structure has the following advantages. The cleaning brush 3 can be far more easily produced as compared with a cleaning brush of the prior art. Moreover, the heights of the brush pieces 9 can be made so as to be equal to each other, because when the mold for forming the resin block is produced, a portion for forming the brush pieces 9 is set in the same height. Therefore, the step of cutting the brush pieces 9 can be omitted.

Figure 3A:
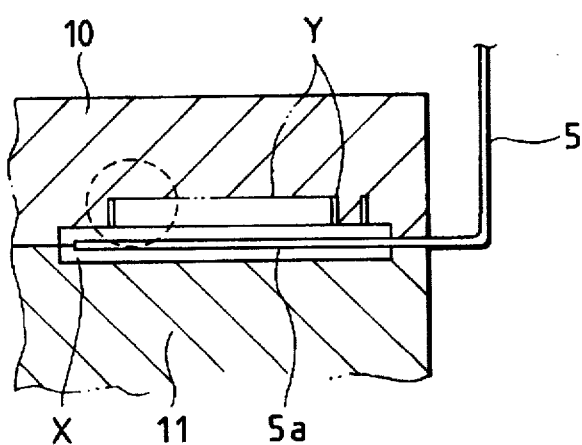
FIGS. 3 (a) and (b) are views illustrating a production process of the cleaning brush.
Figure 3B:
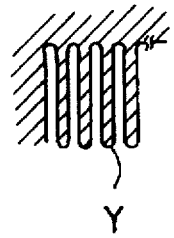
Figure 4:
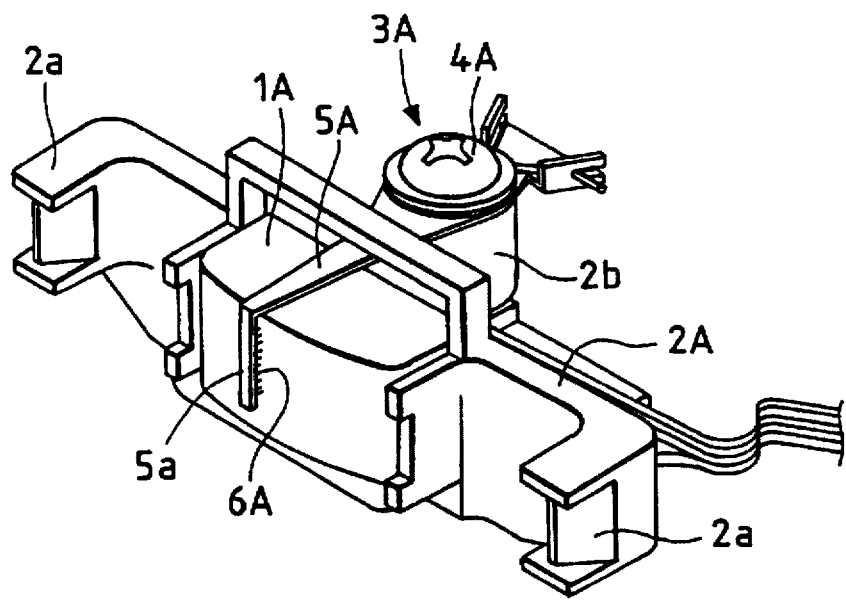
FIG. 4 is a perspective view of a prior art cleaning mechanism for a magnetic head.
Figure 5:
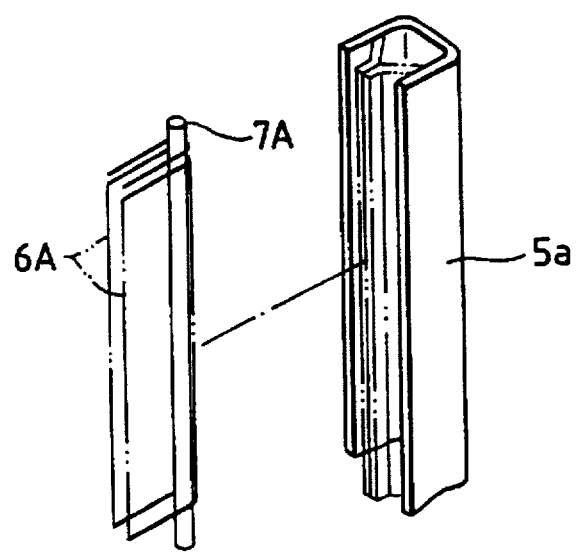
FIG. 5 is an exploded perspective view of essential portions of a cleaning brush used in the cleaning mechanism for a magnetic head.

FIG. 3 (a) shows a preferred production process of the cleaning brush 3 having the above-described structure. The end portion 5a of the brush stem 5 which is bent into an L-shape is placed between an upper mold 10 and a lower mold 11 between which a block cavity X is formed. The resin block 8 is formed integrally with the end portion 5a by injection molding. Specifically, as shown in FIG. 3 (B), a number of brush voids Y are formed so as to be continuous with the block cavity X. At the same time as the molding of the resin block 8, therefore, a number of flexible brush pieces 9 are formed on the surface of the resin block 8.

In the case where the above-described molding method is adopted, the production can be efficiently performed by the following steps. First, a single blank plate is stamped into a number of brush stems 5 which are arranged in parallel and have a stem-like shape. The resin block 8 and the brush pieces 9 are molded on each brush stem 5, and thereafter the respective brush stems 5 are bent so as to have an L-shape. Then, the brush stems 5 are cut out of the blank plate.

As apparent from the above description, according to the invention, it is possible to obtain a cleaning mechanism which has a very simple structure and can be produced at a lower cost as compared with a prior art cleaning brush.

What is claimed is:

1. A cleaning mechanism for a magnetic head having a recording/reproducing face, said cleaning mechanism for contacting said recording/reproducing face and comprising:

a basal portion supported by a device fixing portion connected to said magnetic head;

an L-shaped brush stem connected swingably to said basal portion, said L-shaped brush stem comprising a metal plate and having an end portion;

a resin block covering and connected to said end portion of said L-shaped brush stem; and at least one brush piece molded integrally with said resin block, such that said resin block and said resin brush comprise a single monolithic structure, wherein said brush piece comprises a strip of flexible material positioned along a length of said resin block.

2. A cleaning mechanism as in claim 1, wherein said resin block and said brush piece comprise a single continuous, unbroken surface.

3. A cleaning mechanism as in claim 1, wherein said resin block includes a plurality of brush pieces, each of said brush pieces having a same height.

4. A magnetic head assembly comprising:

a magnetic head having a recording surface;

a resin brush connected swingably to said magnetic head for cleaning said recording surface, wherein said brush includes a stem and a resin block connected to said stem, said block including at least one resin brush piece, wherein said resin block and said at least one resin brush piece are integrally formed and comprise a single monolithic structure, wherein said brush piece comprises a strip of flexible material positioned along a length of said block.

5. A magnetic head assembly as in claim 4, wherein said block and said brush piece comprise a single continuous, unbroken surface.

6. A magnetic head assembly as in claim 4, wherein said block includes a plurality of brush pieces, each of said brush pieces having a same height.

7. A cleaning mechanism for a magnetic head assembly including a brush having a stem, said brush being made by a process comprising steps of:

placing said stem in a mold; and injecting a flexible material in said mold to integrally form a block and at least one brush piece on an end of said stem, wherein said mold includes an upper mold and a lower mold forming a block cavity having a shape of said block said upper mold including at least one brush void having a shape of said at least one brush piece, wherein said block cavity and said brush void comprise a continuous opening.

8. A cleaning mechanism as in claim 7, wherein said material comprises resin.

9. A cleaning mechanism as in claim 7, wherein said block and said brush piece are formed in a single mold by injection molding such that said block and said brush piece comprise a single monolithic structure.

10. A cleaning mechanism as in claim 7, wherein said injecting step simultaneously forms said block and said brush piece.

11. A cleaning mechanism as in claim 7, wherein said stem comprises a plate having a plurality of stems and said process further comprises steps of sequentially inserting said stems in said mold and sequentially injecting said material to integrally form a block and at least one brush piece on each of said stems.

* * * * *